US011055211B2

(12) United States Patent
Iida et al.

(10) Patent No.: US 11,055,211 B2
(45) Date of Patent: Jul. 6, 2021

(54) CONTROL DEVICE

(71) Applicant: Hitachi, Ltd., Tokyo (JP)

(72) Inventors: Takahiro Iida, Tokyo (JP); Masahiro Matsubara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 16/310,848

(22) PCT Filed: Jul. 1, 2016

(86) PCT No.: PCT/JP2016/069567
§ 371 (c)(1),
(2) Date: Dec. 18, 2018

(87) PCT Pub. No.: WO2018/003107
PCT Pub. Date: Jan. 4, 2018

(65) Prior Publication Data
US 2020/0310949 A1 Oct. 1, 2020

(51) Int. Cl.
*G06F 11/36* (2006.01)
*G06F 8/65* (2018.01)
*G05B 9/02* (2006.01)

(52) U.S. Cl.
CPC .......... *G06F 11/3688* (2013.01); *G05B 9/02* (2013.01); *G06F 8/65* (2013.01)

(58) Field of Classification Search
None
See application file for complete search history.

(56) References Cited

U.S. PATENT DOCUMENTS

| 2004/0039500 | A1  | 2/2004  | Amendola et al. |
|--------------|-----|---------|-----------------|
| 2005/0035966 | A1* | 2/2005  | Pasquarette ........... G06F 3/0486 345/440 |
| 2012/0259505 | A1* | 10/2012 | Turban ................ G06F 11/0739 701/31.8 |
| 2015/0067400 | A1* | 3/2015  | Ishii ...................... G06F 11/079 714/37 |
| 2017/0344671 | A1* | 11/2017 | Wilson ................... G06F 30/20 |

FOREIGN PATENT DOCUMENTS

| JP | 2004-519751 A | 7/2004 |
| JP | 2008-234520 A | 10/2008 |

OTHER PUBLICATIONS

International Search Report (PCT/ISA/210) issued in PCT Application No. PCT/JP2016/069567 dated Aug. 30, 2016 with English translation (two (2) pages).

(Continued)

*Primary Examiner* — Philip Wang
(74) *Attorney, Agent, or Firm* — Crowell & Moring LLP

(57) ABSTRACT

The purpose of the present invention is to provide a control device with which it is possible to verify the safety of a control system when an application is partially updated. Using a safety analysis unit which, accepting an architecture of control software and a fault mode per function block constituting the architecture as inputs, generates and evaluates a fault tree, the present invention determines whether or not there is a problem with the safety of the control software and thereby makes it possible to determine whether or not the control software is safe.

1 Claim, 6 Drawing Sheets

(56) References Cited

OTHER PUBLICATIONS

Japanese-language Written Opinion (PCT/ISA/237) issued in PCT Application No. PCT/JP2016/069567 dated Aug. 30, 2016 with English translation (three (3) pages).
Takahashi et al., "A Study for Software Fault Tree Analysis", IEICE Technical Report Chino Software Kogaku, Jul. 15, 2015, vol. 115, No. 154, pp. 111-118 with English Abstract, (eight (8) pages).

\* cited by examiner

FIG. 3
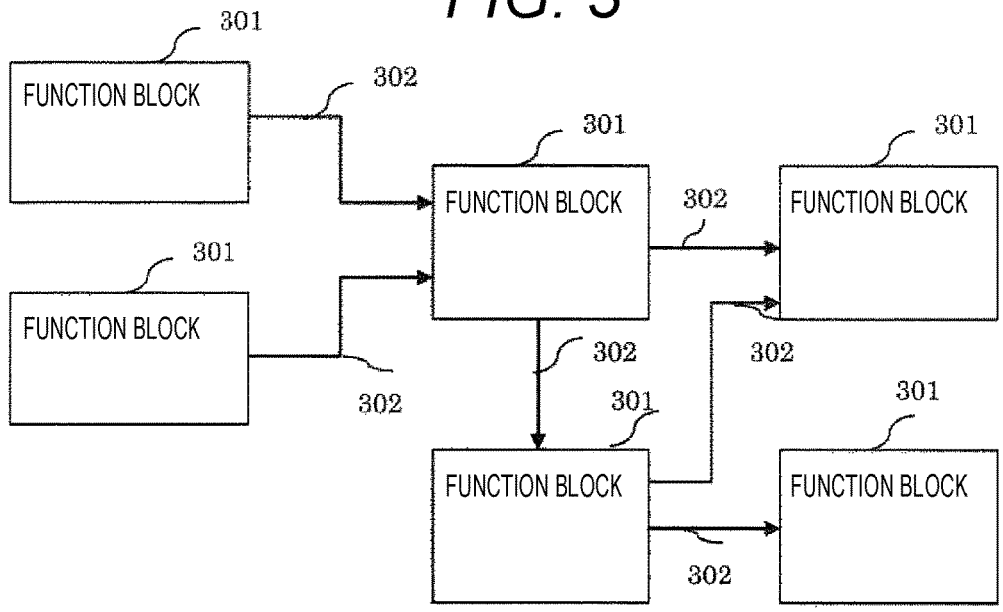
FIG. 4
| No | FUNCTION BLOCK | INPUT IF No. | INPUT IF | OUTPUT IF No. | OUTPUT IF |
|---|---|---|---|---|---|
| A1 | REQUEST INPUT UNIT | 1 | 1. PKB SW | 4 | 4. CONTROL REQUEST |
| A2 | SENSOR INFORMATION INPUT UNIT | 2 | 2. WHEEL SPEED | 5 | 5. DETERMINATION DURING VEHICLE STOP |
|  |  | 3 | 3. ACCELERATION | 6 | 6. DETERMINATION DURING SLIP |
| A3 | CONTROL MANAGER | 4 | 4. CONTROL REQUEST | 7 | 7. CONTROL STATE |
|  |  | 5 | 5. DETERMINATION DURING VEHICLE STOP |  |  |
|  |  | 6 | 6. DETERMINATION DURING SLIP |  |  |
FIG. 5
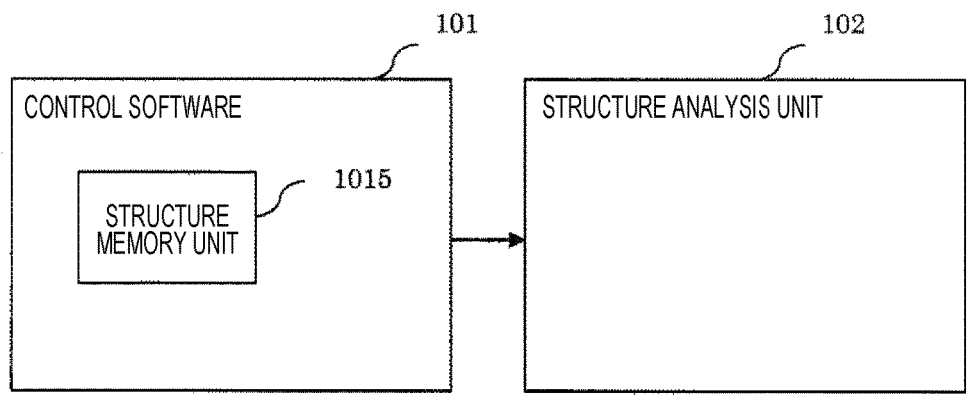

| APPLICATION NAME | INPUT DATA NAME | DATA TYPE | OUTPUT DATA NAME | DATA TYPE |
|---|---|---|---|---|
| APP 1 | IN 1 | FLAG | OUT 1 | FLAG |
| | IN 2 | STATE | OUT 2 | STATE |
| | ... | ... | ... | ... |

FIG. 8A

| FAULT MODE | INFLUENCE TO OUTPUT SIDE |
|---|---|
| CURRENT COMMAND VALUE DOES NOT CHANGE | MOTOR DOES NOT OPERATE |
| CURRENT COMMAND VALUE IRRELATIVE TO INPUT VALUE IS CALCULATED | MOTOR OPERATES WITHOUT COMMAND |
| ERRONEOUS CURRENT COMMAND VALUE IS CALCULATED | MOTOR OPERATES WITHOUT COMMAND |
| | MOTOR EXCESSIVELY OPERATES |

FIG. 8B

| FAULT MODE | INFLUENCE TO OUTPUT SIDE |
|---|---|
| CONTROL COMMAND VALUE IS NOT CALCULATED | CURRENT COMMAND VALUE DOES NOT CHANGE |
| CONTROL COMMAND VALUE IRRELATIVE TO INPUT VALUE IS CALCULATED | ERRONEOUS CURRENT COMMAND VALUE IS CALCULATED |
| | CURRENT COMMAND VALUE DOES NOT CHANGE |
| ERRONEOUS CONTROL COMMAND VALUE IS CALCULATED | ERRONEOUS CURRENT COMMAND VALUE IS CALCULATED |
| | CONTROL COMMAND VALUE DOES NOT CHANGE |

FIG. 9

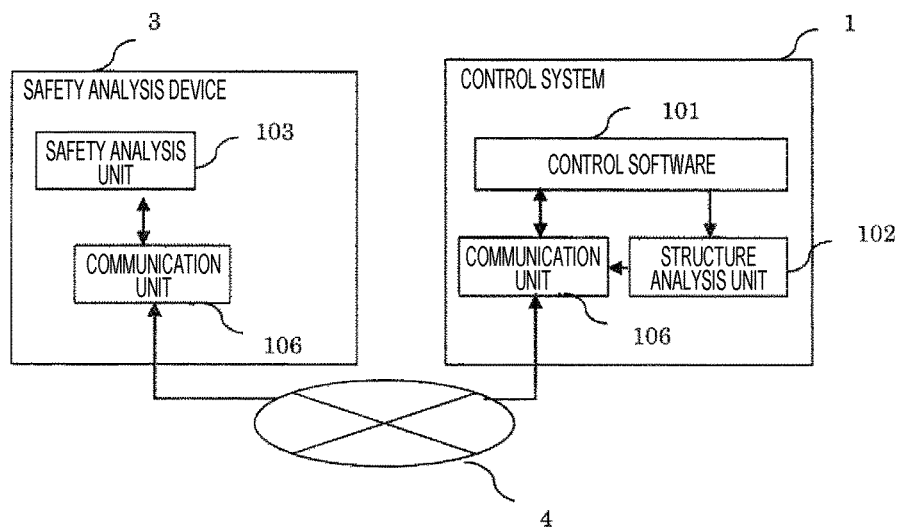

CONTROL DEVICE

TECHNICAL FIELD

The present invention relates to a control device for a control system.

BACKGROUND ART

One of background art in this technical field is JP 2008-234520 A (PTL 1). An object of this publication is "to make accurate fault prediction using minimum necessary resources". As a solution, it is described that "a behavior monitoring module is assigned to an application to be monitored, and behavior of the application is collected", then, "a resource upper limit of behavior monitoring is set, and resources are distributed to the behavior monitoring module having detected a sign of fault within the resource upper limit".

CITATION LIST

Patent Literature

PTL 1: JP 2008-234520 A

SUMMARY OF INVENTION

Technical Problem

It is an important technique to detect a sign of fault even in a control device, and it is necessary to detect the fault after guaranteeing in the first place that control software does not perform a dangerous operation. If the control software is constructed with a plurality of applications designed by a plurality of designers or companies, it is necessary to provide a means for guaranteeing the safety in the first place. In PTL 1, however, it is difficult to determine whether or not the currently operating control software itself is appropriate for safety.

Therefore, a purpose of the present invention is to provide a control device with which it is possible to verify the safety of a control system when an application is partially updated.

Solution to Problem

In order to solve the above problem, one embodiment of the present invention preferably uses, for example, the technical idea to be described in the claims.

Advantageous Effects of Invention

According to the present invention, it is possible to verify the safety of the control system when the application is partially updated.

BRIEF DESCRIPTION OF DRAWINGS

FIG. 3 is an example illustrating an architecture of the first embodiment.

FIG. 4 is an example of a tabular form of the architecture of the first embodiment.

FIG. 5 illustrates an example illustrating a structure analysis unit and control software of the first embodiment.

FIGS. 8A and 8B are examples of a fault mode table of the first embodiment.

FIG. 9 is a configuration example of a safety analysis device according to a second embodiment.

DESCRIPTION OF EMBODIMENTS

Hereinafter, examples (embodiments) of preferred embodiments of the present invention will be described.

First Embodiment

<Configuration of Control Device>

Figure 1:
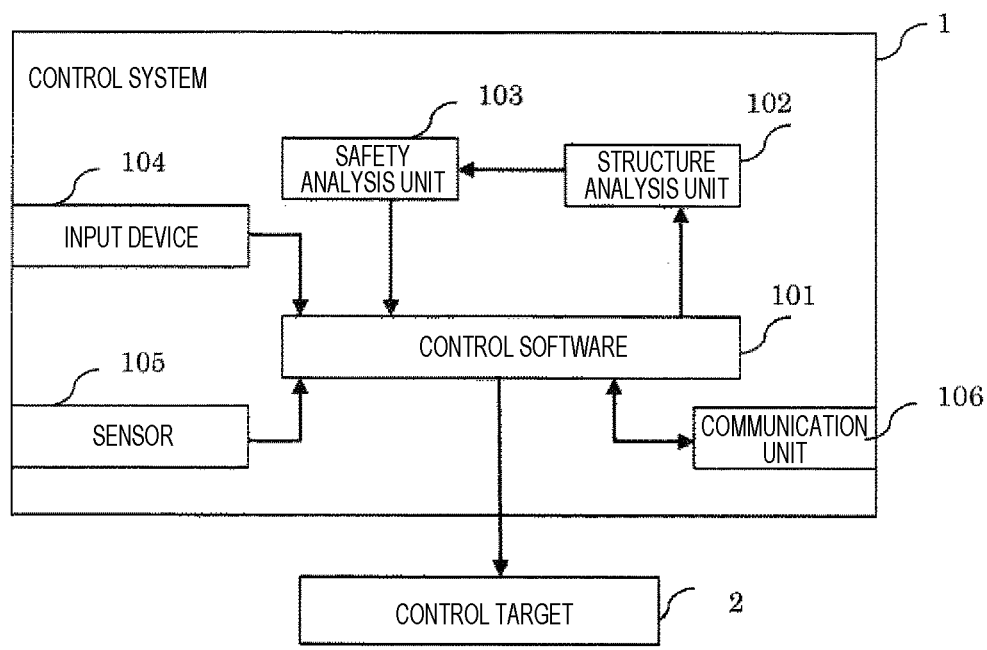
FIG. 1 illustrates an example of a control system of a first embodiment.

FIG. 1 illustrates a configuration of a control device according to the present embodiment. A control system 1 includes control software 101, and notifies a control target 2 of a command value calculated by the control software 101. The control target 2 operates in accordance with the command value of the control software. A structure analysis unit 102 analyzes an architecture of the control software 101 based on identification information of the control software and a behavior. In addition, a safety analysis unit 103 performs safety analysis of software from the architecture of the control software 101 to analyze whether or not to perform a dangerous behavior (hazard) of the control system. The control software 101 determines whether to continue or interrupt the control based on an analysis result of the safety analysis unit 103.

<Control System>

The control system 1 is one whose actual mechanism operates according to a command value calculated by control software of an automobile, a construction machine, a plant, or the like. The actual mechanism is the control target 2. The control target 2 corresponds to one that actually operates by supply of a current like a motor or an external output device such as a display and a speaker. The control system 1 includes an input device 104 to be operated by an operator. The input device 104 is one that allows input of arbitrary data such as a switch, a keyboard, and a touch panel. The control system 1 also includes a sensor 105 configured to acquire information on the outside world. The sensor 105 acquires various physical values such as temperature, brightness, speed, and acceleration, and notifies the control software 101. In addition, the control system also includes a communication device 106 for connection with another control system or network. The network refers to a communication path to transmit and receive data such as Ethernet (registered trademark) and radio.

<Control Software>

Figure 2:
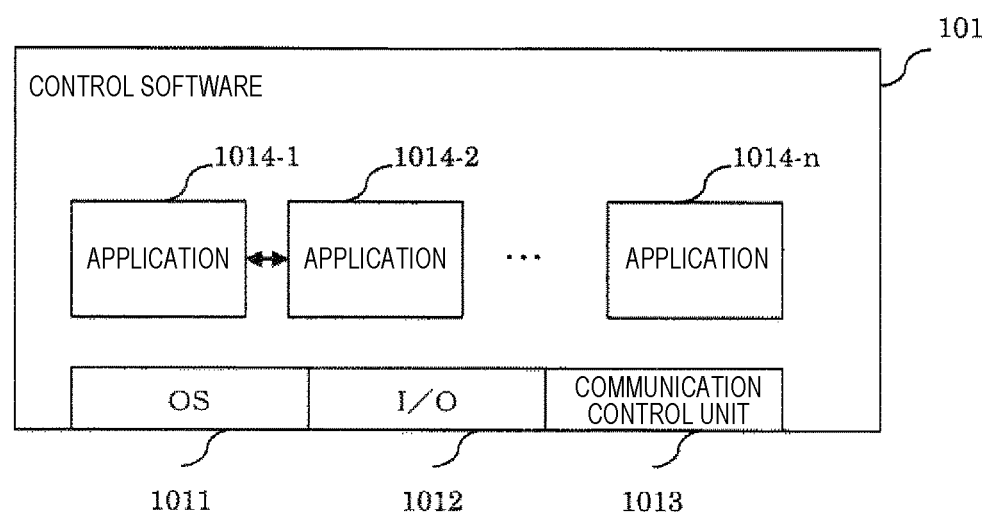
FIG. 2 is an example of control software of the first embodiment.

An example of the structure of the control software 101 is illustrated in FIG. 2. The control software 101 includes an operating system (OS) 1011, an I/O 1012, and a communication control unit 1013 as basic software, and includes a plurality of applications 1014 operating on the basic software. The basic software functions to control hardware such as a CPU of the control system, a microcomputer, and a peripheral circuit thereof, and the I/O 1012 controls input/output devices such as the input device 104 and the sensor 105 to store, acquire, and process input data and output data thereof. In addition, the communication control unit 1013 controls the communication unit 106 to store, acquire, and process input data and output data thereof. The OS 1011 controls a CPU function and provides service, such as resource allocation and task allocation, to the application 1014. The application 1014 performs calculation for control of the control target 2 with data obtained from the I/O 1012, the communication control unit 1013, and the other applications 1014 as inputs. A result of the calculation is output to the I/O 1012, the communication control unit 1013, and the other applications 1014. There are various types of calculation performed by the applications, and there are a function of calculating a control command value of the control target 2, a function of diagnosing whether another application 1014 operates normally, and calculation for diagnosis of an abnormality of the input and output devices such as the sensor 104 and the communication unit 106.

<Control Software Architecture>

Examples of control software architecture (hereinafter referred to as architecture) according to the present embodiment are illustrated in FIGS. 2 and 3.

FIG. 3 is a block diagram illustrating the architecture. The architecture of FIG. 3 is constituted by function blocks 301 and interfaces 302. The function block 301 corresponds to the software application 1014. The function block 301 can represent not only the application 1014 but also functions configuring software such as the OS 1011, the I/O 1012, the communication control unit 1013, and the like. The interface 302 represents flow of data exchanged between the function blocks. Data represents a discrete value such as a flag and a state value, a continuous value representing a physical value, a software variable, and the like. A function block has one or more output interface and input interface. The architecture represents flow of data of software by the function blocks 301 and the interfaces 302 between the function blocks.

FIG. 4 illustrates the architecture by a data list.

A function block No., a function block name, an input IF No., an output IF No. are described in the data list of FIG. 4. Each No. is described using a number, an alphabet, and the like. Each No. may have a corresponding name, and each name thereof may be described in the architecture table. A number that can be uniquely identified is described as the function block No. A duplicate number among the respective function blocks may be described as the input IF No. It is not allowed to describe a duplicate number among the respective function blocks as the output IF NO. It is possible to represent an input/output relation between function blocks by describing the same input IF No. and output IF No. For example, the input IF No. 4 of the function block No. A3 in FIG. 4 is associated with the output IF No. 4 of the function block No. A1, and it is possible to represent that there is an input/output relation between the function block No. A1 and the function block No. A3.

<Structure Analysis Unit>

The structure analysis unit is a function of analyzing the architecture of the control software 101 based on the data of the control software 101. The structure analysis unit may be implemented as one of the applications 1014 of the control software 101, or may be implemented as one circuit of hardware on which the control software 101 is mounted.

In the first embodiment, an input from the control software to the structure analysis unit is architecture information of the control software.

FIG. 5 illustrates a relationship between the control software 101 and the structure analysis unit 102 according to the present embodiment. In the present embodiment, a structure memory unit 1015 is prepared as one type of the applications 1014 in the control software. The structure analysis unit 102 acquires information on each application stored in the structure memory unit. The structure analysis unit constructs the architecture data illustrated in FIG. 3 and FIG. 4 based on the information of each application.

Figures 6, 7:
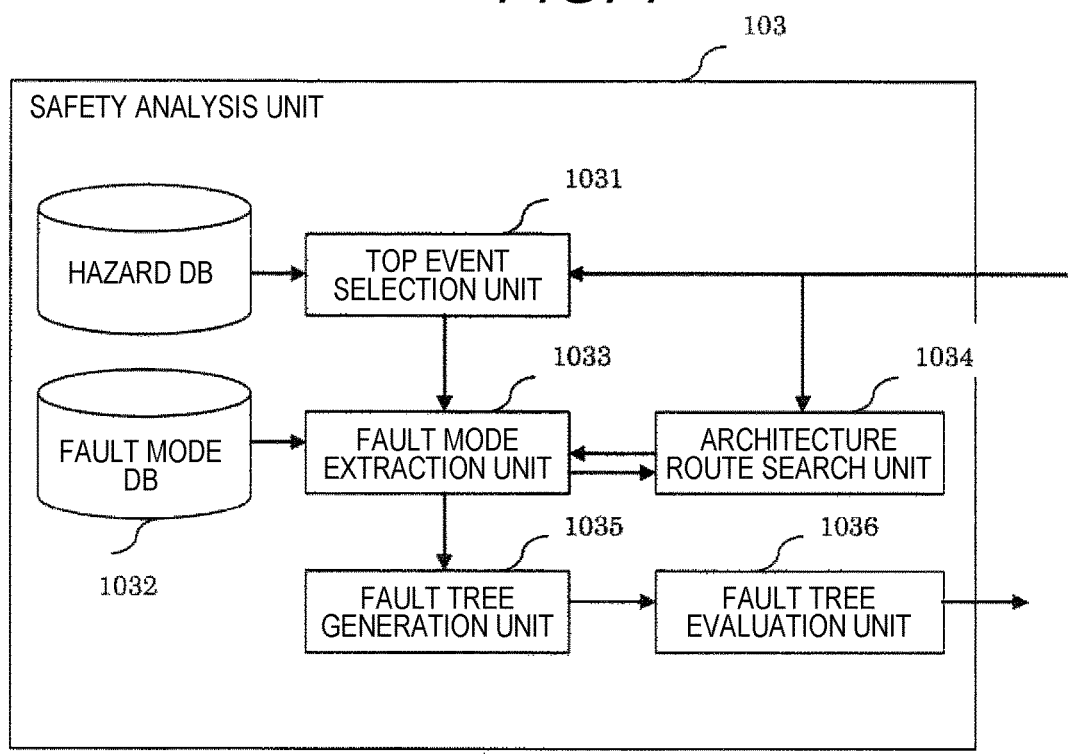
FIG. 6 is a table illustrating application information of the first embodiment.
FIG. 7 is a structure of a safety analysis unit of the first embodiment.

FIG. 6 illustrates application information. As the application information, each application name, input data name and output data name to the application, and a data type of input/output data are stored. Data types such as an Int type, a Float type, and Boolean are described as the data types of the input data and output data. Not only a type handled in programming languages such as a C-language but also a data type arbitrarily set may be set as the data type.

The structure analysis unit allocates the application 1014 to the function block and constructs the architecture using the data names and the types of the input data and the output data so as to be unique data.

The structure memory unit 1015 may be mounted separately from each application 1014 or may be mounted as a part of the application 1014.

<Safety Analysis Unit>

The safety analysis unit 103 analyzes the architecture obtained from the structure analysis unit 102 and detects that the control software does not implement dangerous behavior of the control system.

FIG. 7 illustrates a configuration of the safety analysis unit 103. The safety analysis unit 103 includes a top event selection unit 1031, a fault mode DB 1032, a fault mode extraction unit 1033, an architecture route search unit 1034, a fault tree generation unit 1035, and a fault tree evaluation unit 1036. The top event selection unit 1031 selects an output IF that causes dangerous behavior of the control system and a function block that outputs this output IF from the architecture and notifies the fault mode extraction unit. The fault mode DB 1032 stores a fault mode table for each function block, and notifies the fault mode extraction unit 1033 of a fault mode. The fault mode extraction unit 1033 selects the fault mode table of the function block to be analyzed from the fault mode DB, and selects a fault mode causing a fault of the output IF of the function block to be analyzed. The fault mode extraction unit 1033 selects a fault of the input IF which is a cause of the selected fault mode. The fault mode extraction unit 1033 outputs the input IF to the architecture route search unit 1034 in order to acquire a function block that calculates and outputs the input IF. The architecture route search unit searches for the function block that outputs the input IF that has been input from the input architecture, and notifies the fault mode extraction unit 1033 of the function block. The fault mode extraction unit 1033 extracts these fault modes again using the received and notified input IF as an output IF together with the notified function block. The fault mode table describes the presence or absence of a safety mechanism against fault. It is assumed that safety validity is hardly determined when a fault tree having a branch with no appearance of the safety mechanism is created or a function block without fault mode is detected at the time of searching for the fault mode.

<Fault Mode Table>

FIG. 8 illustrates examples of the fault mode table. The fault mode table describes a fault mode and influence on the output side. FIG. 8(a) is an example of a motor control application. The motor control application calculates a current command value for operation of a motor based on input data. In the fault mode, a fault relating to an abnormality in the current calculation is calculated. A malfunction of the motor, which is an output destination, is described as the influence on the output side. FIG. 8(b) is a fault mode table of a control command unit that outputs a command value to a motor control unit. As illustrated in FIG. 8, it is necessary to describe the same fault as described in any one of the influence on the output side of the other fault mode table as the fault mode to be described. However, since the input/output units of the control software, such as the communication unit and the I/O, serve as the input unit of the architecture, a fault mode thereof does not match the influence on the output side of the other fault mode.

<Dangerous Behavior of Control System>

The dangerous behavior of the control system refers to behavior of a system that harms people such as an accident of an injury or the like. For example, if a brake of a moving body does not operate, such a malfunction may cause an accident as a result of colliding with an obstacle. Such a factor that causes a serious accident to be analyzed for each such control system is referred to herein as the dangerous behavior of the control system.

The dangerous behavior of the control system is analyzed by FTA or the like, and a fault mode of the system is derived. For example, the malfunction of the motor constituting a brake system is raised as a cause of the malfunction of the brake. In this case, a factor that "the brakes does not operate" is analyzed with respect to the dangerous behavior of the control system of "failing in deceleration and causing an accident", and further, the operation of the control system that "the motor does not operate" is derived with respect to the phenomenon "the brake does not operate". Such an operation of the control system is stored in a hazard DB. The operation stored in the hazard DB needs to be described in the influence on the output side of the fault mode table stored in the fault mode DB.

According to the present embodiment, it is possible to determine the safety of the control system from the architecture of the control system and to restrict or stop the operation as a determination result is received by the control software. Even if the application of the control system is partially rewritten by update or the like, it is possible to analyze whether or not dangerous behavior occurs and to prevent dangerous behaviors beforehand so that it is possible to confirm the safety of the control system.

Second Embodiment

A vehicle control system according to a second embodiment of the present invention will be described. A difference from the first embodiment is that a safety analysis unit is provided to be independent of a control system so that it is possible to analyze safety of the control system without increasing installation cost of the safety analysis unit in the control system.

FIG. 9 illustrates a configuration of the present embodiment. In the present embodiment, the control system is connected to a safety analysis device 3 via a communication path 4. In the present embodiment, the structure analysis unit analyzes information of an application received from control software and constructs an architecture. The architecture is transmitted to a communication unit in order to notify the safety analysis unit of the architecture. The communication unit 106 transmits the received architecture to the communication unit 106 of the safety analysis device 3. The safety analysis unit 103 performs the safety analysis described in the first embodiment based on the received architecture and evaluates whether it is safe or not. The communication unit 106 is notified of a result of the evaluation. The communication unit 106 of the safety analysis device sends the evaluation result to the communication path 4 in order to send the evaluation result to the communication unit 106 of the control system 1. The control software 101 can stop and restart the operation of the control software based on the evaluation result received by the communication unit 106.

According to the present embodiment, development cost of the control system to confirm the safety can be suppressed since the safety analysis unit is independent of the control system. In addition, even if the control system is illegally remodeled or illegally rewritten by the control software, the safety analysis device can analyze the safety of the control system without being affected by the illegal rewriting. Further, the safety analysis device performs safety analysis of a plurality of control systems, and thus, it is possible to aggregate and manage fault modes and hazards, and the safety analysis can be performed from a wider viewpoint as compared to management with a control system alone.

Third Embodiment

A third embodiment according to the present invention will be described. A difference from the first embodiment is that a safety analysis unit and a structure analysis unit exist on a system different from a control system.

Figure 10:
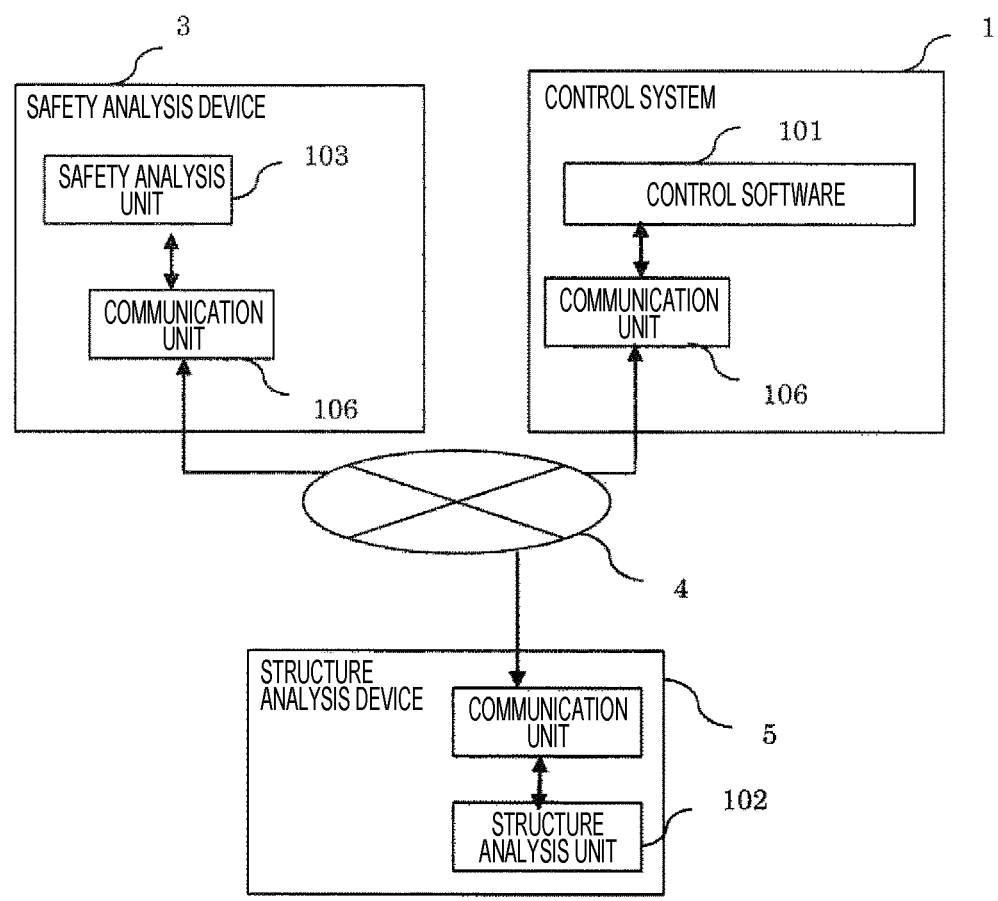
FIG. 10 is a configuration example of a safety analysis device according to a third embodiment.

FIG. 10 illustrates a configuration of the present embodiment. In the present embodiment, the control system 1, the safety analysis device 3, and a structure analysis device 5 are connected via the communication path 4. Each of the control system 1, the safety analysis device 3, and the structure analysis device 5 has the communication unit 106 for connection to the communication path 4. The control software 101 sends application information to the communication unit 106 in order to notify the structure analysis unit of its own application information. The communication unit 106 of the control system 1 sends the application information to the communication path for the destination of the structure analysis device 5, and the communication unit 106 of the structure analysis device 5 sends the received application information to the structure analysis unit 102. The structure analysis unit performs the analysis described in the first embodiment and constructs an architecture. The structure analysis unit transmits the architecture to the communication unit in order to notify the safety analysis unit 103 of the safety analysis device 3 of the architecture. The communication unit 106 transmits the received architecture to the communication unit 106 of the safety analysis device 3. The safety analysis unit 103 performs the safety analysis described in the first embodiment based on the received architecture and evaluates whether it is safe or not. The communication unit 106 is notified of a result of the evaluation. The communication unit 106 of the safety analysis device sends the evaluation result to the communication path 4 in order to send the evaluation result to the communication unit 106 of the control system 1. The control software 101 can stop and restart the operation of the control software based on the evaluation result received by the communication unit 106.

According to the present embodiment, development cost can be reduced as much as the structure analysis unit is not included in each control system since the structure analysis device is independent of the control system. Further, the structure analysis unit is separately provided from the control system and structures of the plurality of control systems can be analyzed over the communication path, and thus, it is possible to perform analysis by changing only the structure analysis unit when changing a structure analysis method.

Fourth Embodiment

A third embodiment according to the present invention will be described. A difference from the first embodiment is that a structure analysis unit exists on a system different from a control system.

Figure 11:
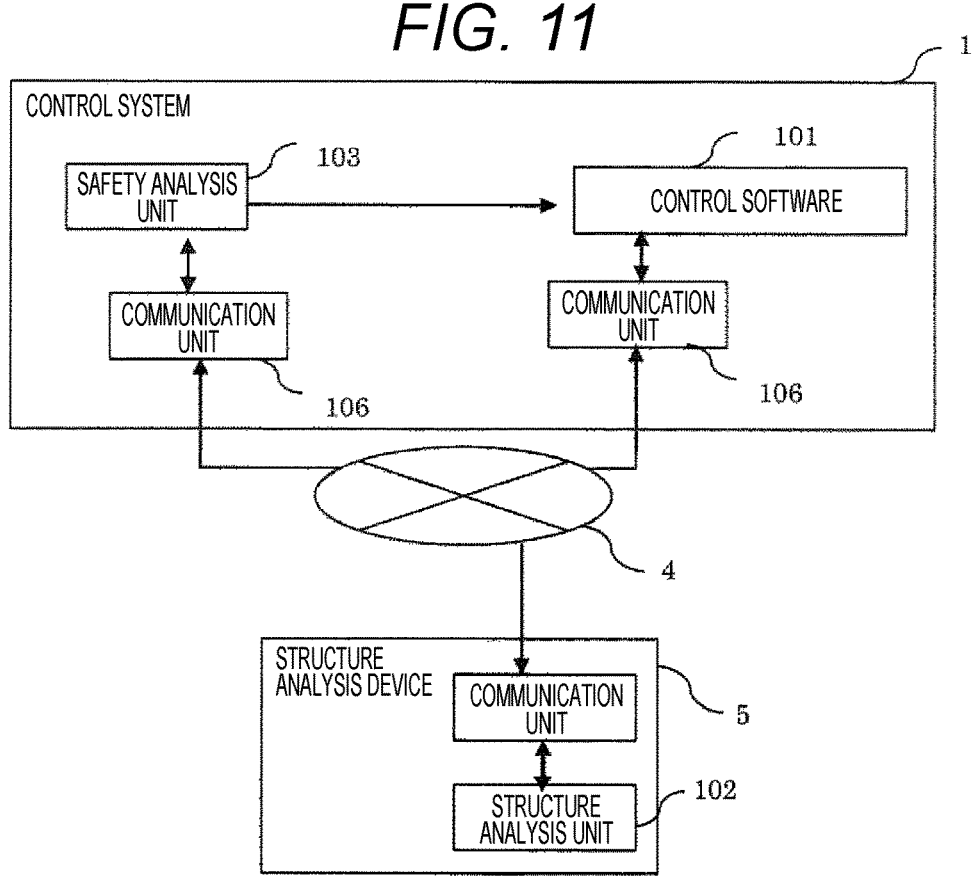
FIG. 11 is a configuration example of a safety analysis device according to a fourth embodiment.

FIG. 11 illustrates a configuration of the present embodiment. In the present embodiment, the control system 1 and the structure analysis device 5 are connected via the communication path 4. Each of the control system 1, the safety analysis device 3, and the structure analysis device has the communication unit 106 for connection to the communication path 4. The control software 101 sends application information to the communication unit 106 in order to notify the structure analysis unit of its own application information. The communication unit 106 of the control system 1 sends the application information to the communication path for the destination of the structure analysis device 5, and the communication unit 106 of the structure analysis device 5 sends the received application information to the structure analysis unit 102. The structure analysis unit performs the analysis described in the first embodiment and constructs an architecture. The structure analysis unit transmits the architecture to the communication unit in order to notify the safety analysis unit 103 of the control system 1 of the architecture. The communication unit 106 transmits the received architecture to the communication unit 106 of the safety analysis device 3. The safety analysis unit 103 performs the safety analysis described in the first embodiment based on the received architecture and evaluates whether it is safe or not. The control software 101 can stop and restart the operation of the control software based on the evaluation result.

According to the present embodiment, development cost can be reduced as much as the structure analysis unit is not included in each control system since the structure analysis device is independent of the control system. Further, the structure analysis unit is separately provided from the control system and structures of the plurality of control systems can be analyzed over the communication path, and thus, it is possible to perform analysis by changing only the structure analysis unit when changing a structure analysis method. In addition, the safety analysis unit 104 exists on the control system differently from the third embodiment, and thus, it is possible to constantly monitor the behavior of the control software.

Fifth Embodiment

A third embodiment according to the present invention will be described. A difference from the first embodiment is that it is possible to make software, which has been determined not to be safe, not updated by performing safety analysis at the time of software update.

Figure 12:
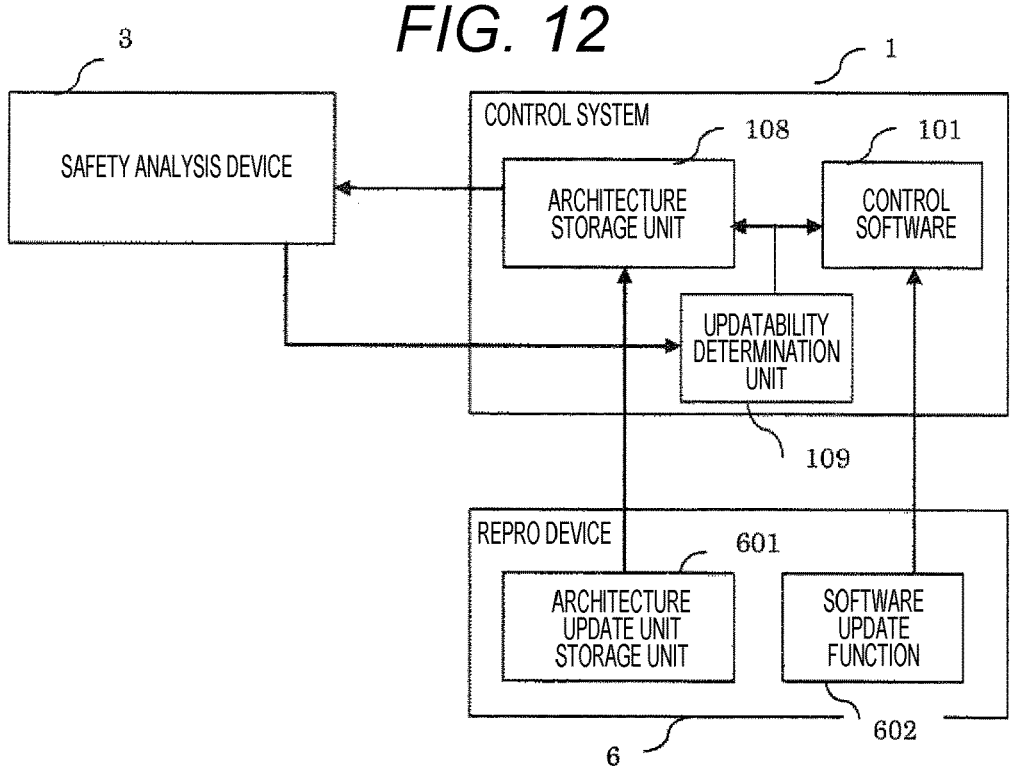
FIG. 12 is a configuration example of repro support using a safety analysis device of a fifth embodiment.

A structure of the present embodiment is illustrated in FIG. 12. In FIG. 12, the control system 1, the safety analysis device 3, and a repro device 6 are connected via the communication path 4. FIG. 12 does not illustrate the communication path 4 and the communication unit 106 of each device. In the present embodiment, the repro device 6 has an architecture update unit storage unit 601 and a software update function 602. In addition, the control system 1 has an architecture storage unit 108 and an updatability determination unit 109.

In the present embodiment, a procedure at the time of updating the control system will be described. The repro device 6 is connected to the control system 1 via the communication path. First, the architecture update unit storage unit 601 transmits architecture information of a difference between undated control software and updated software to the architecture storage unit 108. The architecture of the control software is stored in the architecture storage unit 108. The architecture storage unit 108 creates an updated architecture obtained by overwriting an architecture update unit and transmits the updated architecture to the safety analysis device 3. The safety analysis device 3 performs the safety analysis described in the first embodiment and outputs a result of the safety analysis to the control system 1. The updatability determination unit determines whether or not the safety analysis result has a problem and decides whether to update the software. When the software is updatable, the updatability determination unit 109 outputs an updatable flag to the architecture storage unit 108 and the control software 101. When acquiring the updatable flag, the architecture storage unit 108 overwrites the architecture difference received from the architecture update unit storage unit 601 to the architecture stored in the architecture storage unit 108. In addition, the control software 101 updates update data transmitted from the software update function to the control software.

According to the present embodiment, it is possible to determine whether or not the software updated at the time of software update performs an operation which poses a safety problem, and it is possible to maintain the control software with which the control system does not perform a dangerous operation.

REFERENCE SIGNS LIST 1 control system
101 control software
2 control object
102 structure analysis unit
103 safety analysis unit
104 input device
105 sensor
106 communication device
1011 OS
1012 I/O
1013 communication control unit
1014 application
301 function block
302 interface
1015 structure memory unit
1031 top event selection unit
1032 fault mode DB
1033 fault mode extraction unit
1034 architecture route search unit
1035 fault tree generation unit
1036 fault tree evaluation unit
3 safety analysis device
4 communication route
5 structure analysis device
601 architecture update unit storage unit
602 software update function
108 architecture storage unit
109 updatability determination unit

The invention claimed is:

1. A control device comprising:

an architecture storage unit in which an architecture of software is stored, wherein the stored architecture is updated when there is an architecture update, and the updated architecture is output, wherein the updated architecture that has been output is input to a safety analysis unit that analyzes an architecture fault; and an updatability determination unit that determines whether or not control software is updatable in accordance with an analysis result of the safety analysis unit, wherein the safety analysis unit includes:

a top event selection unit that selects an output interface that causes dangerous behavior of the control device and a function block that outputs the output interface from the architecture from a fault mode table, including a list of influences on an output relating to the function block of the output interface of the architecture, as a top event;

a fault mode extraction unit that acquires a fault mode corresponding to the top event or the function block from the fault mode table;

an architecture route search unit that searches for a function block relating to a certain function block from architecture route information and outputs the searched function block; and a fault tree generation unit that configures the fault mode extracted by the fault mode extraction unit as a fault tree.

* * * * *